Aug. 15, 1967   D. M. CHUTE ETAL   3,336,039
STROLLER CONVERTIBLE TO HIGH CHAIR
Filed June 24, 1965
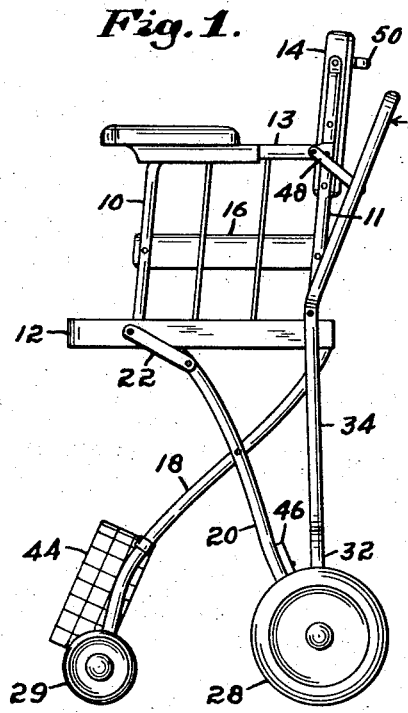
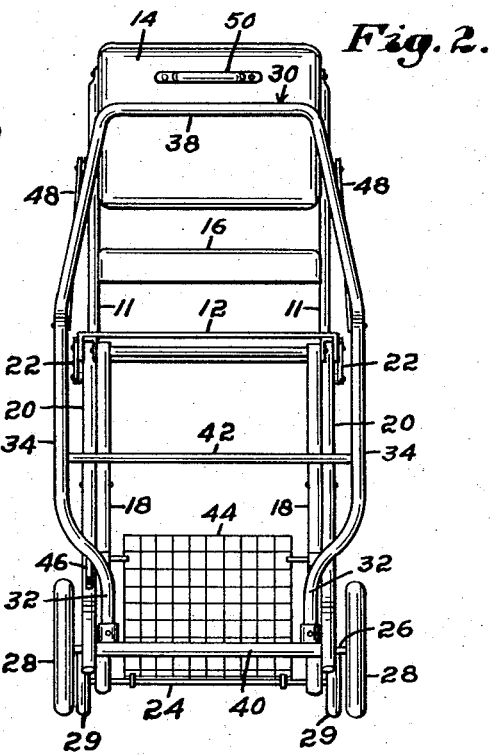
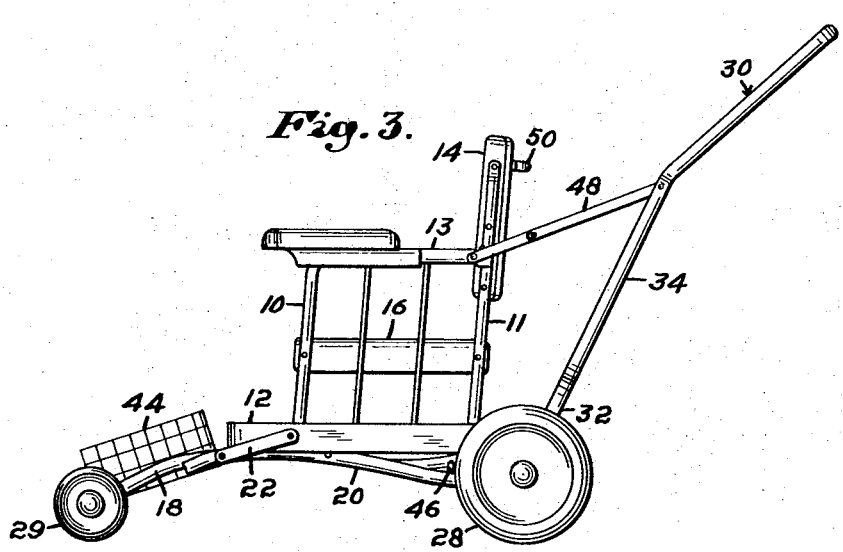
Inventors:
Dorothy M. Chute &
Phillip Elfman,
by Gordon Needleman
Atty.

United States Patent Office 3,336,039
Patented Aug. 15, 1967

3,336,039
STROLLER CONVERTIBLE TO HIGH CHAIR
Dorothy M. Chute, 64 Linden Ave., and Phillip Elfman,
32 Magnolia St., both of Malden, Mass. 02148
Filed June 24, 1965, Ser. No. 466,618
4 Claims. (Cl. 280—41)

This invention relates generally to combination chairs and more specifically to a combined stroller and high chair.

An object of the present invention is to provide a stroller which may be converted into a high chair by legs which pivot in relation to each other.

The invention will be more clearly understood from the following detailed description when read in conjunction with the accompanying drawing in which:

FIG. 1 is a side elevation of the chair in the upright position;

FIG. 2 is a rear elevation showing the chair in the down position;

FIG. 3 is a side elevation of the chair in the down position.

The embodiment of the invention shown in FIGS. 1 through 3 of the drawings comprises generally a chassis, two sets of pivoted legs, a push handle and two sets of wheels.

The chassis includes two forward uprights 10 and two rear uprights 11 mounted in spaced aligned relationship to each other on a frame member 12 and each pair of forward and rear 11 uprights being connected by a cross member 13. The frame member 12 is formed of a channeled steel and is generally U shaped in configuration and has an upper surface which is substantially in right angle relationship with the forward 10 and rear uprights 11.

The assembly of each forward upright 10, rear upright 11, and cross member 13 form the arm of the chair of the convertible stroller, which also includes a seat back 14 and a seat 16.

A pair of tubular steel legs having a shallow arc and a reverse shallow arc formed therein and whose upper terminal end lies within the area defined by the frame member 12 are pivotally mounted to each other at approximately the center of their length and each of the front legs 18 has its rear terminal end pivoted on the side of the frame member 12 by a bracket member which extends from the frame member 12, and each of the rear legs 20 is pivotally attached to the front side of the frame member 12 through a link 22 with the portion attached to the frame member 12 rearward of the forward portion of the link 22. The link 22 pivots on both the frame member 12 and the upper portion of the rear leg 20. The relation of the legs 18 and 20 to each other and to the frame member 12 allows the chair to be raised and lowered, as will be more fully described hereinafter. A front axle 24 and rear axle 26 connect the free terminal ends of the legs 18 and 20 respectively through holes formed proximate the free terminal ends remote from the frame member 12. A wheel is engaged with each free end of an axle, outside the legs 18 and 20, and rotatable around the axis of the axle. The rear wheels 28 are of greater diameter than the front wheels 29.

The push handle 30 comprises a pair of connector portions 32 each one arced outwardly to a plane beyond the transverse distance defined by the frame member 12 and then continued as a side arm 34 which is in spaced parallel relation with its counterpart and each has a bend away from the chair back 14. The side arms 34 terminate in ends which are connected by a handle 38. A bracing element 42 connects the upper portion of each of the connector portions 32. The bracing element 42 is in spaced parallel relationship with the axis of the handle 38. Each of the connector portions 32 is welded to a tubular cover 40 which surrounds the rear axle 26.

A hinged link 48 is pivotally engaged to each of the cross members 13, on an outside surface, and to the inside of the side portion 34 of the push handle 40. The hinge of the hinged link 48 is arranged to bend away from the axis of the axle 26.

To raise the chair from a lowered position, the push handle 30 is held stationary and the chair; having a handle 50, fixed at the upper middle portion of the rear surface of the seat back 14, is lifted upwardly causing the lower portion of the front legs 18 and the wheels 29 to move backward toward the rear axle 26 while the upper portion of the legs 18 move forwardly and upwardly with the frame member 12, simultaneously the rear legs 20 pivot on the front legs 18. The upper portion of the rear legs 20 move rearwardly and upwardly while the lower portion of the rear legs 20 move forward toward the front axle 24. When the legs 18 and 20 have completed their movement the push handle 30 is pushed forward toward the seat back 14 and the hinged link 48 folds and then straightens out fully allowing the side arms 34 to pass outside the frame member 12. The free terminal ends of the rear legs 20 will each butt against the undersurface of the frame member 12.

The chair is lowered by reversing the above procedure.

A basket 44 is connected to front axle 24 and movably connected to the lower portions of the front legs 18 by a sleeve formed on each side of said basket remote from the front axle 24 and circumscribing each of said front legs 18 as shown in FIG. 2.

A locking member 46 is mounted on the lower portion of one of the rear legs 20. The locking member 46 may be rotated to frictionally engage against the outer periphery of the rear wheel 28 which it is most proximate to.

Since certain other obvious modifications may be made in this device without departing from the scope of the invention, it is intended that all matters contained herein be interpreted in an illustrative and not in a limiting sense.

We claim:

1. A convertible chair comprising a chassis including a chair having a pair of arms, each of said arms having a cross member and a frame member supporting said arms, a pair of legs mounted on each side of said frame member and a push handle, each of said pair of legs comprising a front leg pivotally engaged with a rear leg, each of said legs having an upper portion and a lower portion, said upper portion of each of said rear legs pivotally mounted to said frame member by a link, and said lower portion of each of said rear legs connected by a rear axle, said upper portion of each of said front legs mounted in pivoted engagement to said frame member and said lower portion of said front legs connected by a front axle, a front wheel rotatable mounted on each end of said front axle outside each of said front wheel, and a rear wheel mounted on each end of said rear axle outside of each rear leg, and said one piece push handle comprising a pair of connector portion in spaced relation to each other, each of said connector portions being arced outwardly to a plane beyond the transverse distance defined by said frame member, each of said connector portions continued as a side arm, said side arms being in spaced parallel relation to each other, and each side arm having a bend away from said chassis and having a terminal end, said terminal ends of said side arms connected together by a handle bar, each of said side arms connected to said cross member on its respective side of said chassis, by a hinged link having free terminal ends, one of said terminal ends of said hinged link pivotally connected to said side arm and the other terminal end of said hinged link pivotally mounted to said cross member and each of said connector portions having a free terminal end mounted on a sleeve surrounding said rear axle.

2. A convertible chair as set forth in claim 1 wherein each of said upper portions of said rear legs abutts the undersurface of said frame member when said convertible chair is in an upright position.

3. A convertible chair as set forth in claim 2 wherein said hinged link bends toward said rear axle when said convertible chair is moved from a lowered to an upright position.

4. A convertible chair as set forth in claim 3 wherein said chair includes a chair back and said side arms being in parallel relation for part of their length and bent toward each other and said handle bar having a length less than the length of said chair back.

References Cited
UNITED STATES PATENTS

| | | | |
|---|---|---|---|
| 478,172 | 7/1892 | Reeves | 280—41 |
| 873,283 | 12/1907 | Wolfenden et al. | 280—41 |
| 2,474,388 | 6/1949 | Wasserman | 280—36 |
| 2,715,936 | 8/1955 | Galloway. | |
| 2,976,912 | 3/1961 | Dias. | |
| 3,109,666 | 11/1963 | Wilson | 280—30 |

KENNETH H. BETTS, *Primary Examiner.*